United States Patent
Huot-Marchand

(10) Patent No.: US 12,099,330 B2
(45) Date of Patent: Sep. 24, 2024

(54) METHOD FOR MANUFACTURING AN EPILAME MECHANICAL PART

(71) Applicant: ETA SA MANUFACTURE HORLOGÈRE SUISSE, Grenchen (CH)

(72) Inventor: Sylvain Huot-Marchand, Le Locle (CH)

(73) Assignee: ETA SA MANUFACTURE HORLOGÈRE SUISSE, Grenchen (CH)

(*) Notice: Subject to any disclaimer, the term of this patent is extended or adjusted under 35 U.S.C. 154(b) by 246 days.

(21) Appl. No.: 17/760,640

(22) PCT Filed: Oct. 1, 2020

(86) PCT No.: PCT/EP2020/000166
§ 371 (c)(1),
(2) Date: Mar. 15, 2022

(87) PCT Pub. No.: WO2021/063534
PCT Pub. Date: Apr. 8, 2021

(65) Prior Publication Data
US 2022/0334538 A1 Oct. 20, 2022

(30) Foreign Application Priority Data
Oct. 2, 2019 (EP) .................................. 19200948

(51) Int. Cl.
*G04B 29/02* (2006.01)
*B29C 64/135* (2017.01)
(Continued)

(52) U.S. Cl.
CPC .......... *G04B 29/027* (2013.01); *B29C 64/135* (2017.08); *B33Y 10/00* (2014.12);
(Continued)

(58) Field of Classification Search
CPC .......... B33Y 10/88; B33Y 80/00; G04B 15/14
See application file for complete search history.

(56) References Cited

U.S. PATENT DOCUMENTS

| | | | | |
|---|---|---|---|---|
| 3,743,777 A | * | 7/1973 | Hanus | C08L 67/00 |
| | | | | 427/508 |
| 2013/0287955 A1 | * | 10/2013 | Portet | C10M 107/00 |
| | | | | 564/201 |

(Continued)

FOREIGN PATENT DOCUMENTS

| | | |
|---|---|---|
| CN | 103476908 A | 12/2013 |
| CN | 108587381 A | 9/2018 |

(Continued)

OTHER PUBLICATIONS

Bose et al. Process Optimization of Ultrasonic Spray Coating of Polymer Films, Langmuir, 2013, 29, pp. 6911-6919. (Year: 2013).*

(Continued)

*Primary Examiner* — Kelly M Gambetta
(74) *Attorney, Agent, or Firm* — Sughrue Mion, PLLC

(57) ABSTRACT

The invention relates to a method for manufacturing an epilame mechanical part (2) comprising a substrate (4) made of a first material, the method comprising at least:

a step (10) of depositing an epilame product (6) consisting of a second material on the substrate (4), said deposition being carried out in the form of a projection onto the substrate (4) of at least one collimated or localised beam (12; 12A, 12B) of material containing the epilame product (6); and a step (11) of treating the second material to ensure the cohesion of the components on the substrate (4).

13 Claims, 1 Drawing Sheet

(51) Int. Cl.
    *B29L 31/00*     (2006.01)
    *B33Y 10/00*     (2015.01)
    *B33Y 80/00*     (2015.01)
    *G04B 15/14*     (2006.01)
    *G04D 3/00*     (2006.01)

(52) U.S. Cl.
    CPC .............. *B33Y 80/00* (2014.12); *G04B 15/14* (2013.01); *G04D 3/0082* (2013.01); *G04D 3/0084* (2013.01); *G04D 3/0087* (2013.01); *G04D 3/0089* (2013.01); *B29L 2031/739* (2013.01)

(56) References Cited

U.S. PATENT DOCUMENTS

2018/0112144 A1     4/2018   Rannoux et al.
2018/0318872 A1   11/2018   Letondor et al.

FOREIGN PATENT DOCUMENTS

| CN | 108795210 A | 11/2018 |
| EP | 3 192 853 A1 | 7/2017 |
| WO | 2016/203063 A1 | 12/2016 |

OTHER PUBLICATIONS

C Decker, et al., "Focus: UV-radiation curing of vinyl ether-based coatings", Surface Coatings International 2000 (4), Dec. 31, 2000, pp. 173-180, BNSDOCID:< XP_55260572A_I>.
International Search Report for PCT/EP2020/000166 dated Mar. 17, 2021.
Written Opinion for PCT/EP2020/000166 dated Mar. 17, 2021.

\* cited by examiner

METHOD FOR MANUFACTURING AN EPILAME MECHANICAL PART

CROSS REFERENCE TO RELATED APPLICATIONS

This application is a National Stage of International Application No. PCT/EP2020/000166 filed Oct. 1, 2020, claiming priority based on European Patent Application No. 19200948.8 filed Oct. 2, 2019.

TECHNICAL FIELD OF THE INVENTION

The invention relates to a method for manufacturing an epilame mechanical part.

The invention also relates to an epilame mechanical part obtained according to such a manufacturing method. The mechanical part, which comprises a substrate on which an epilame layer is deposited, is for example a timepiece, typically a plate, an anchor lifter, a wheel, a balance or else an axis.

PRIOR ART

In the field of mechanical components in frictional contact and in relative displacement, such as for example the field of watchmaking, the proper operation of mechanical parts depends, among other things, on their lubrication. The main function of a lubricant thus used is to separate the surfaces in contact in relative displacement while reducing energy dissipation and wear.

The lubricants used are mainly divided into two categories: fluid lubricants and lubricants using a lubrication called solid lubrication of mechanisms. Solid lubricants, which generally have a lamellar structure, are used less in the watchmaking field than fluid lubricants, because they are intrinsically generators of debris. Such solid lubricants thus have the disadvantage of causing mechanical wear in the more or less long term. However, such wear, which is difficult to predict, proves to be very detrimental to the reliability of a horological movement.

Fluid lubricants are generally in the form of more or less viscous greases or oils. They have the advantage of being easier and faster to apply than solid lubricants. The volume of lubricant to be used is also more easily controlled. The physical features of oils (viscosity, wettability, etc.) allow the lubrication of several functional areas of a mechanism, regardless of its complexity. The energy generated by heating is mainly dissipated by the oil. An oil film is generally formed again, even after rupture and with a low volume used. The fluid must as much as possible remain confined in the functional areas whereas it naturally tends to spread out. The durability of the lubricant thus depends on its retention in the operating area: however, any watchmaker has observed that a drop of lubricant spreads out quickly on a clean part. While this ability proves to be beneficial since all the sensitive areas of a mechanism are effectively covered, it can also prove to be detrimental to the proper operation of the assembly. Indeed, a loss of oil in critical regions, typically areas of contact and relative displacement of the parts (functional areas), accentuated by a potential degradation of the latter under severe operating conditions, can cause irreversible damage. Furthermore, the lubricant can get in unwanted places and cause adhesion problems or, more generally, aesthetic problems.

The spreading of fluid lubricants, whether in the form of oils or greases, therefore poses a major problem for the operation of timepiece mechanisms. In the case of greases, a demixing is very often seen between the soap and the base oil. The latter will therefore be able to migrate onto the surfaces of the part and leave the functional areas, which leads to the problem mentioned above for fluid lubricants in the form of oils. In general, a fluid lubricant holds in place when its surface tension is higher than that of the support on which it is deposited. If the surface tension of the lubricant is too low, the oil will spread out and will not stay in its place.

In order to overcome this problem, watchmakers deposit a coating called epilame on their components. This epilame, which often comes in the form of an invisible oleophobic molecular layer, is a product that decreases the apparent surface tension of the support. It should be noted that the surface tension given by an epilame is of the order of 20 to 30 mN/m while the surface tension of a timepiece oil is typically 35 mN/m. This difference of 5 to 15 mN/m gives a drop shape with a connection angle acceptable to watchmakers. It is generally of the order of 25 to 60. This allows to keep the lubricant in the desired area. A greater angle can lead to an unwanted displacement (ball of lubricant rolling on the surface like water on new Gore-Tex™ for example).

This epilame can be deposited in several ways but the mainly known method, for this purpose, consists of dipping the mechanical part to be epilame-coated in a solution composed of a solvent and a certain amount of molecules which will be deposited on the surface of the part so as to modify its surface tension. The solvent is then evaporated during a next step, leaving only the molecular layer of molecules deposited. The epilame then covers the entire surface of the part. In the first moments of operation and in the areas of friction, the epilame is removed by abrasion, leaving a surface that the lubricant can wet. Some critical mechanisms such as the escapement can be left to operate for a minimum period of time for this epilame abrasion to occur. Once this operation is completed, a new lubrication is carried out. The lubricant then wets the surfaces where the abrasion has occurred exactly at the point of friction.

However, one of the major disadvantages of such a dip coating method is related to the fact that it requires dipping a large amount of parts in baths wherein the concentrations of "active" molecules decrease, which requires a regular process monitoring and which entails a possible technical risk of having a too low concentration and therefore a too low epilame effect. In addition, the epilame-coating solvents based on fluorinated compounds implemented by this method often contravene the existing standards, which are in particular intended to fight against the greenhouse gas emission. And finally, this method provides in particular for a too-high concentration of "active" molecules or a more ecological but less volatile solvent which can cause stains during the epilame-coating operation. However, they can be located far from the functional areas and therefore do not require epilame-coating.

Furthermore, such a method is likely to cause aesthetic problems on the part, due to poor evaporation of the solvent and/or lack of concentration in the epilame. More generally, such a global dipping deposition method is relatively imprecise because it is not localised, and does not spare the contact areas.

SUMMARY OF THE INVENTION

The purpose of the invention is therefore to provide a method for manufacturing an epilame mechanical part allowing a local deposition of epilame on the part in order to delimit precise areas of confinement of a lubricant, in a simple and inexpensive manner.

To this end, the invention relates to a method for manufacturing an epilame mechanical part, which comprises the features mentioned in independent claim 1.

Particular embodiments of the method are defined below.

Thanks to the step of depositing in the form of a projection onto the substrate of at least one collimated or localised beam of material containing the epilame product, the method according to the invention allows a very precise deposition of epilame on the part, both in volume of deposited fluid and in localisation. It is thus understood that, unlike to the methods of the prior art, the thin epilame bead is here deposited locally on the part, which allows to confine the lubricant in an area delimited by the deposited bead. The surface thus delimited is then perfectly wetted by the lubricant, guaranteeing perfect operation for the part provided that the delimited area corresponds to at least one targeted functional area. It should be noted that, in the context of the present invention, the epilame product deposited can indifferently be an epilame product resulting in a grip or a repulsion of lubricant by physical effect, by chemical effect, or else via a combination between these two effects.

Advantageously, the deposition step comprises a phase of nebulisation of an ink containing the epilame product in the form of a solution or suspension of particles, and a phase of projecting the nebulised ink onto the substrate of the part; and the step of treating the second material comprises a phase of curing said second material. This method corresponds to the method called AJP (Aerosol Jet Printing) method. It will be noted in an alternative, that some inks did not require a curing step, for example by crosslinking strictly speaking. A brief moment in the open air is enough for the solvent to evaporate and the resin to crosslink "all by itself". Such a method offers a very wide variety in the choice of possible materials for the deposition of epilame product, and allows a very precise deposition, in particular at the micrometric scale on flat but also flexible and/or three-dimensional parts.

According to a particular technical feature of the invention, the curing phase consists of a heat treatment which includes at least an annealing step and/or a localised sintering step and/or a vacuum step. This speeds up the solidification process. In the case of an epilame product containing active components in solid and pulverulent form, such a heat treatment further allows to melt the material to ensure cohesion between the grains.

According to another particular technical feature of the invention, the localised sintering step is obtained by irradiating said second material by means of a laser.

According to another particular technical feature of the invention, the curing phase consists of polymerisation by photo-crosslinking and/or by chemical crosslinking.

According to another particular technical feature of the invention, the phase of polymerisation by photo-crosslinking is obtained by the projection of ultraviolet rays onto the material containing the epilame product, at a predetermined wavelength.

According to another particular technical feature of the invention, the step of treating said second material comprises at least one of the following phases:
a phase of modifying the chemical structure of the material containing the epilame product, in particular an ion implantation phase;
a phase of modifying the crystallographic structure of the material containing the epilame product, in particular a localised laser heat treatment phase;
a phase of modifying the roughness of the material containing the epilame product, in particular a laser treatment phase.

According to one embodiment of the invention, the deposition of the epilame product is carried out in the form of a projection onto the substrate of a localised bead of material containing the epilame product, said bead being a continuous or discontinuous bead.

Advantageously, the localised bead of material has a width of at least 10 µm, preferably at least 15 µm.

According to another embodiment of the invention, the deposition of the epilame product is carried out in the form of a projection onto the substrate of two collimated or localised beams of liquid material, at least one of the liquid materials containing the epilame product, the two liquid materials projected by the beams being selected so as to cause solidification when contacted with each other.

According to a first variant embodiment of the invention, during the deposition step, the projection onto the substrate of at least one collimated or localised beam of material containing the epilame product is carried out by means of at least one fixed projection nozzle, the or each projection nozzle being configured to project substantially vertically, from top to bottom, a collimated or localised beam of material; the orientation and/or the position in space of the substrate being modified during the deposition step. Such a configuration, implementing a vertical projection of material from top to bottom, improves the precision of the deposition of epilame product, which allows to guarantee that the deposition is carried out at the desired precise location on the part.

According to a second variant embodiment of the invention, during the deposition step, the projection onto the substrate of at least one collimated or localised beam of material containing the epilame product is carried out by means of at least one projection nozzle movably mounted relative to the substrate, for example mounted on a multi-axis robot; the substrate being kept fixed during the deposition step.

According to a particular technical feature of the invention, the second material consists of a single component, in particular a polymer, more particularly an epoxy resin. The polymer is typically a photosetting polymer or a thermosetting polymer.

Alternatively, the second material comprises several components.

Each of the components is typically in liquid or solid form.

According to a particular technical feature of the invention, each of the components is selected from the group of components consisting of: a surfactant component; a solvent; a component having a physical, chemical or mechanical repulsion function; a component having an aesthetic function; a component having a function intended to promote crosslinking; or a combination thereof.

Advantageously, the substrate comprises a surface comprising said epilame product, said surface including:
an outer section of the substrate which limits this substrate in all directions, that is to say the outer face of the substrate, or
a portion of this outer section, that is to say a portion of the outer face of the substrate.

To this end, the invention also relates to an epilame mechanical part obtained by the manufacturing method described above, and which comprises the features mentioned below.

According to a particular technical feature of the invention, the epilame mechanical part is a timepiece.

BRIEF DESCRIPTION OF THE FIGURES

The purposes, advantages and features of the method for manufacturing an epilame mechanical part according to the invention will become more apparent in the following description on the basis of at least one non-limiting embodiment illustrated by the drawings wherein.

DETAILED DESCRIPTION OF THE INVENTION

Figure 1:
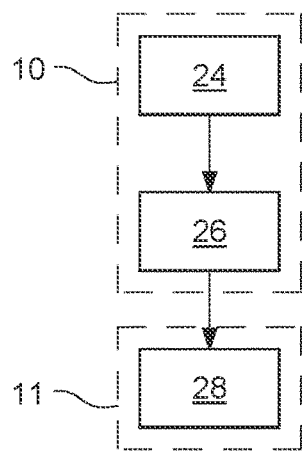
FIG. 1 is a flowchart showing the steps of a method for manufacturing an epilame mechanical part according to the invention.

FIG. 1 shows a method for manufacturing an epilame mechanical part 2 according to the invention. Such an epilame mechanical part 2, which is visible in FIGS. 2 to 4, comprises a substrate 4. This substrate 4 is the support on which the epilame product 6 will be deposited. Such a support capable of receiving the epilame product comprises a surface called epilame surface of this substrate 4. It may be a surface comprising:
- an outer section of the substrate which limits this substrate in all directions, that is to say the entire outer face of the substrate, or
- a portion of this outer section, or a portion of the entire outer face of the substrate.

It is therefore understood that this surface is intended to receive or include this epilame product 6 which aims at reducing the surface tension of this surface and therefore of the support and consequently of the substrate.

The epilame mechanical part 2 can be a timepiece, such as for example a plate, an anchor lifter, a wheel, a balance or else an axis. The part 2 can also be a part of an object using mechanical or micromechanical elements in relative displacement and whose contacts are lubricated with a fluid lubricant that can migrate and thus alter the tribological function. Of course, the method for manufacturing such an epilame mechanical part 2 according to the invention can be suitable for all applications using an epilame.

Returning to FIG. 1, the method comprises an initial step 10 of depositing the epilame product 6 on the substrate 4. The substrate 4 consists of a first material, and the epilame product 6 consists of a second material, distinct of the first material. The first material may consist, for example, of metal, ceramic, ruby, sapphire, plastic, diamond, quartz, glass, silicon carbide, amorphous materials (for example: metallic glasses) or a combination thereof. The second material may consist of a single component, such as for example a polymer. The polymer is typically a photosetting or thermosetting polymer, such as for example an epoxy resin. Alternatively, the second material comprises several components. Each of the components is for example in liquid or solid form. The components can be chosen in particular so that their functions are complementary in order, for example, to promote crosslinking, to facilitate the location of the material, to provide a function specific to the repulsion of the lubricant, to provide an aesthetic function, for example related to the colour or to the texture, to bring a roughness to the deposited material, or else to carry out the transport of the useful component(s) to the final function. As such, the components can be selected from the group of components consisting of: a surfactant component; a solvent; a component having a physical, chemical or mechanical repulsion function; a component having an aesthetic function; or else a component having a function intended to promote crosslinking. A component selected as a solvent can allow to facilitate the transport of the other component(s) useful for the final function. A component selected to give visible pigmentation to the epilame product 6 can allow to visually facilitate the operations carried out by an operator, for example by conferring a colour to the lubricant.

The method comprises a following step 11 of treatment of the second material constituting the epilame product 6 to ensure the cohesion of the components on the substrate 4 of the part 2. These components can be the components of the second material.

The deposition step 10 is performed in the form of a projection onto the substrate 4 of at least one collimated or localised beam 12, 12A, 12B of material containing the epilame product 6. According to a first embodiment of the invention, illustrated in FIG. 2, the deposition is carried out in the form of a projection onto the substrate 4 of a single beam 12 containing the epilame product 6. The beam 12 is for example configured to project onto the substrate 4 a continuous and localised bead 14 of material containing the epilame product 6. The continuous bead 14 typically has a width of at least 10 μm, preferably at least 15 μm. It will be noted that the maximum width of the bead depends on the geometry of the part and the desired aesthetics. In the extreme, it is thus possible to completely cover the part except for the only functional area. In a variant not shown, the beam 12 is configured to project onto the substrate 4 a discontinuous and localised bead of material containing the epilame product, for example in the form of a discontinuous series of patterns such as dots or lines.

Note that the bead must be closed if it is to be confined. By way of example, the beam 12 is configured to project a closed bead of material containing the epilame product onto a substrate 4 on which are drawn migration paths through which the lubricant would displace in a controlled manner. This allows to deposit the lubricant in an easily accessible area from which it migrates towards the targeted functional area but less easy to access.

Figure 3:
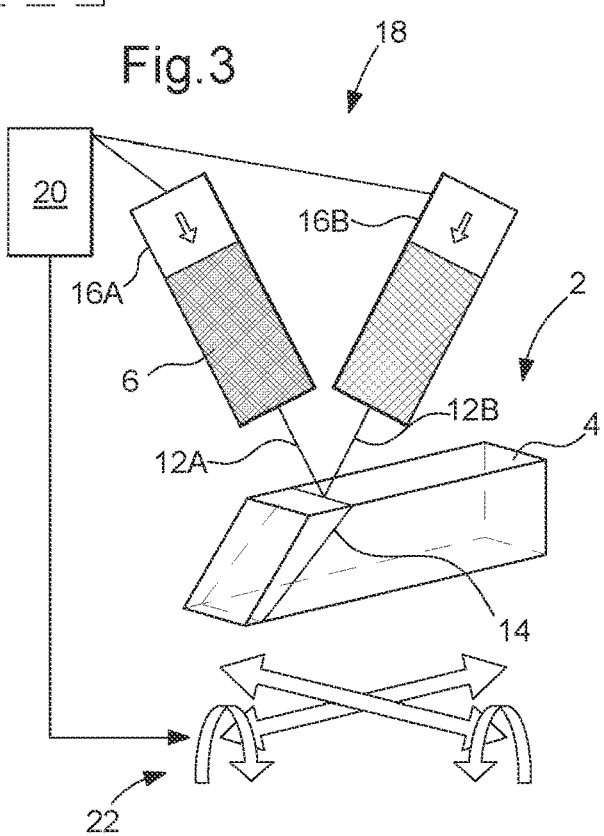
FIG. 3 is a view similar to that of FIG. 2, according to a second embodiment of the invention.
Figure 4:
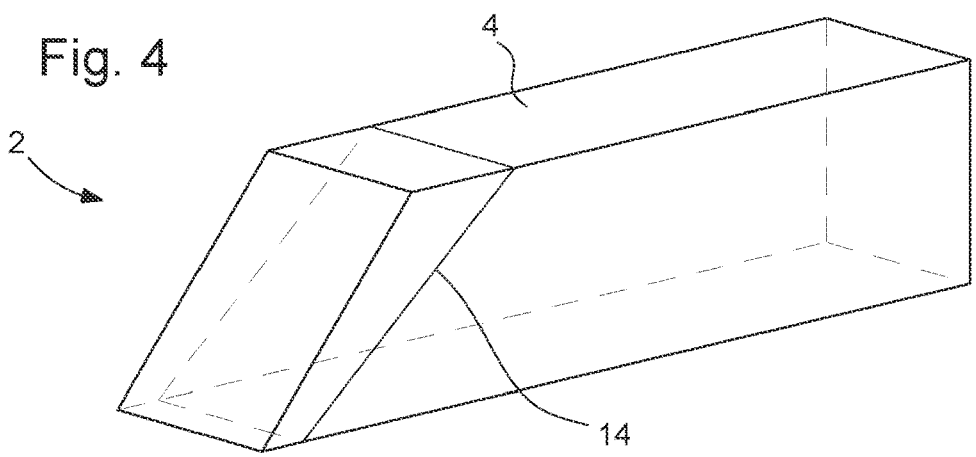
FIG. 4 is a perspective view of an epilame mechanical part obtained by the method of FIG. 1.

According to a second embodiment of the invention, illustrated in FIG. 3, the deposition is carried out in the form of a projection onto the substrate 4 of two collimated or localised beams 12A, 12B of liquid material. At least one of the liquid materials contains the epilame product 6. In the particular embodiment of FIG. 3, only the liquid material projected by the first nozzle 16A contains the epilame product 6. The two liquid materials projected by the beams 12A, 12B are selected so as to cause solidification when contacted with each other. This is the principle of the two-component adhesive AralditeTM, consisting of an epoxy resin and a polymerising agent, 1,4,7,10-tetraazadecane. In contact with these two components, a polyepoxide is formed.

Figure 2:
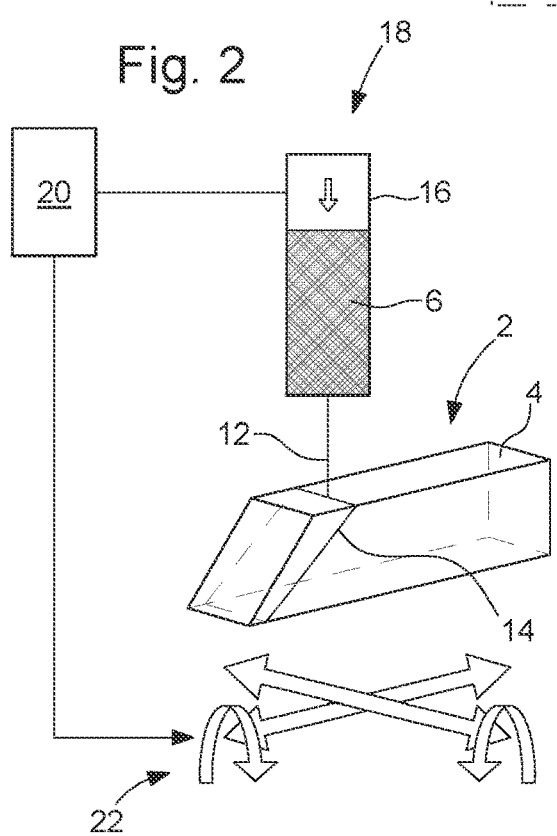
FIG. 2 is a schematic view of a system for implementing the method of FIG. 1, according to a first embodiment of the invention.

Preferably, and as illustrated in the two embodiments of FIGS. 2 and 3, the projection onto the substrate 4 of at least one collimated or localised beam 12, 12A, 12B of material containing the epilame product 6 is carried out by means of at least one fixed projection nozzle 16, 16A, 16B. For this purpose, use is made of a system 18, which comprises, in addition to the nozzle(s) 16, 16A, 16B, a device 20 for controlling the jet projected by said nozzle(s). The mechanical part 2 on which the epilame product 6 is deposited is disposed under the or each nozzle 16, 16A, 16B, directly below said nozzle(s). In the first embodiment illustrated in FIG. 2, the system 18 comprises a single fixed projection nozzle 16. In the second embodiment illustrated in FIG. 3, the system 18 comprises two fixed projection nozzles 16A, 16B, each of the nozzles 16A, 16B projecting one of the collimated or localised beams 12A, 12B of liquid material. In both cases, the or each fixed projection nozzle 16, 16A, 16B is configured to project substantially vertically, from top to bottom, a corresponding beam 12, 12A, 12B of material. The orientation and/or the position in space of the mechanical part 2, and therefore of the substrate 4 on which the epilame product 6 is deposited, are modified during the deposition step 10. For this purpose, the system 18 comprises for example a device 22 for multi-axially positioning the part 2, connected to the control device 20. This allows to precisely adjust the orientation and/or the position in space of the mechanical part 2, via the control device 20. Such a configuration improves the precision of the epilame product 6 deposition, which allows to guarantee that the deposition is carried out at the desired precise location on the mechanical part 2.

In a variant not shown, the multi-axis positioning device 22 is used to confer mobility in space to the or each projection nozzle. The mechanical part 2, and therefore the substrate 4 on which the epilame product 6 is deposited, are then kept fixed during the deposition step 10, by any known means. The positioning device is for example a multi-axis robot, allowing to modify the orientation and/or the position in space of the or each nozzle according to the three dimensions of space, the or each nozzle then moving around the part 2.

Preferably, and although this is not limiting in the context of the present invention, the deposition step 10 comprises a phase 24 of nebulisation of an ink containing the epilame product 6 in the form of a solution or suspension of particles, and a phase 26 of projecting the nebulised ink onto the substrate 4 of the part 2. In this case, the or each projection nozzle 16, 16A, 16B is connected to a nebulisation chamber, such a chamber not being shown in the figures for clarity. The nebulisation phase 24 then takes place in the nebulisation chamber, the projection phase 26 being carried out by the nozzle(s) 16, 16A, 16B, if necessary controlled by the control device 20. The particles are typically micrometric, submicronic, or else nanometric particles, which have an active function of the type of those detailed above. Of course, other variant embodiments are possible for the deposition step 10 without departing from the scope of the present invention. It will be noted that this deposition step described here is based on the AJP, acronym for "Aerosol Jet Printing", technology. However, it is possible to deposit a material by other technologies, such as for example digital printing, the spitting of drops which close together form a bead, etc. It is therefore understood that this deposition step is therefore not only limited to this AJP technology.

When the deposition step 10 comprises a phase 24 of nebulisation of an ink and a phase 26 of projecting the nebulised ink onto the substrate 4, the treatment step 11 preferably comprises, when the ink requires it, a phase 28 of curing the second material. "Curing" means the process of direct or indirect bonding of the particles to obtain their cohesion. It will be noted that certain inks do not require a curing step, for example by crosslinking strictly speaking. A brief moment in the open air is enough for the solvent to evaporate and the resin to crosslink "all by itself".

The curing phase 28 consists for example of a heat treatment of the second material, which includes at least an annealing step and/or a localised sintering step and/or a vacuum step. This is in particular the case when the second material consists of a thermosetting polymer. It will be noted that this annealing step can also be called a step of heating this second material, for example from the application of microwave energy. Such heat treatment allows to accelerate the solidification process. The localised sintering is for example carried out by irradiating the second material by means of a laser, such as an infrared laser for example. Such a natural curing phase can further include, before the actual heat treatment, a natural drying step, typically in the case of a suspension of particles in a volatile solvent.

As a variant, the curing phase 28 can consist of an artificial curing obtained via polymerisation by photo-crosslinking and/or by chemical crosslinking. This is particularly the case when the second material consists of a photosetting polymer. Polymerisation by photo-crosslinking is typically obtained by the projection of ultraviolet rays onto the material containing the epilame product 6, at a predetermined wavelength.

As a further variant, and more generally, step 11 of treating the second material comprises at least one of the following phases:
- a phase of modifying the chemical structure of the material containing the epilame 6 product, in particular an ion implantation phase;
- a phase of modifying the crystallographic structure of the material containing the epilame product 6, in particular a localised laser heat treatment phase; and/or
- a phase of modifying the roughness of the material containing the epilame product 6, in particular a laser treatment phase.

The invention claimed is:

1. A method for manufacturing a mechanical part (2) comprising a substrate (4) made of a first material capable of including an epilame product (6) reducing the surface tension of this substrate, the method comprising at least:
   a step (10) of depositing the epilame product (6) consisting of a second material on the substrate (4), said deposition being carried out in the form of a projection onto the substrate (4) of
   two collimated or localised beams (12A, 12B) of liquid material, at least one of the liquid materials containing the epilame product (6), the two liquid materials projected by the beams (12A, 12B) being selected so as to cause solidification when contacted with each other; and
   a step (11) of treating the second material to ensure the cohesion of the components on the substrate (4), said step (11) comprising a phase (28) of curing said second material comprising a localised sintering step obtained by irradiating said second material by means of a laser or a polymerisation by photo-crosslinking and/or by chemical crosslinking.

2. The manufacturing method according to claim 1, wherein the deposition step (10) comprises a phase (24) of nebulisation of an ink containing the epilame product (6) in the form of a solution or suspension of particles, and a phase (26) of projecting the nebulised ink onto the substrate (4) of the part (2); and wherein the step (11) of treating the second material comprises the phase (28) of curing said second material.

3. The manufacturing method according to claim 1, wherein the curing phase (28) consists of a heat treatment which includes the localised sintering step.

4. The manufacturing method according to claim 1, wherein the phase of polymerisation by photo-crosslinking is obtained by the projection of ultraviolet rays onto the material containing the epilame product (6), at a predetermined wavelength.

5. The manufacturing method according to claim 1, wherein the step (11) of treating said second material comprises at least one of the following phases:
- an ion implantation phase of modifying the chemical structure of the material containing the epilame product (6);
- a localised laser heat treatment phase of modifying the crystallographic structure of the material containing the epilame product (6);
- a phase of modifying the roughness of the material containing the epilame product (6);
- a phase of modifying the roughness of the material containing the epilame product (6) which is a laser treatment phase.

6. The manufacturing method according to claim 1, wherein the deposition of the epilame product (6) is carried out in the form of a projection onto the substrate (4) of a localised bead (14) of material containing the epilame product (6), said bead (14) being a continuous or discontinuous bead.

7. The manufacturing method according to claim 1, wherein the deposition of the epilame product (6) is carried out in the form of a projection onto the substrate (4) of a localised bead (14) of material containing the epilame product (6), said bead (14) being a continuous or discontinuous bead, the localised bead (14) of material having a width less than 10 µm, preferably substantially less than 15 µm.

8. The manufacturing method according to claim 1, wherein, during the deposition step (10), the projection onto the substrate (4) of at least one collimated or localised beam (12; 12A, 12B) of material containing the epilame product (6) is carried out by means of at least one projection nozzle movably mounted relative to the substrate (4), for example mounted on a multi-axis robot; the substrate (4) being kept fixed during the deposition step (10).

9. The manufacturing method according to claim 1, wherein the second material includes an epoxy resin.

10. The manufacturing method according to claim 1, wherein the second material comprises several components.

11. The manufacturing method according to claim 10, wherein each of the components is in liquid or solid form.

12. The manufacturing method according to claim 10, wherein each of the components is selected from the group of components consisting of: a surfactant component; a solvent; a component having a physical, chemical or mechanical repulsion function; a component having an aesthetic function; a component having a function intended to promote crosslinking; or a combination thereof.

13. The method according to claim 1, wherein the substrate comprises a surface called epilame surface comprising said epilame product, said surface including:
- an outer section of the substrate which limits this substrate in all directions, that is to say the entire outer face of the substrate, or
- a portion of this outer section, that is to say a portion of the entire outer face of the substrate.

* * * * *